G. P. AMES.
CORN POPPER.
APPLICATION FILED MAY 8, 1920.

1,382,592.

Patented June 21, 1921.
2 SHEETS—SHEET 1.

George P. Ames
INVENTOR

BY Victor J. Evans
ATTORNEY

WITNESS:

G. P. AMES.
CORN POPPER.
APPLICATION FILED MAY 8, 1920.
1,382,592.
Patented June 21, 1921.
2 SHEETS—SHEET 2.
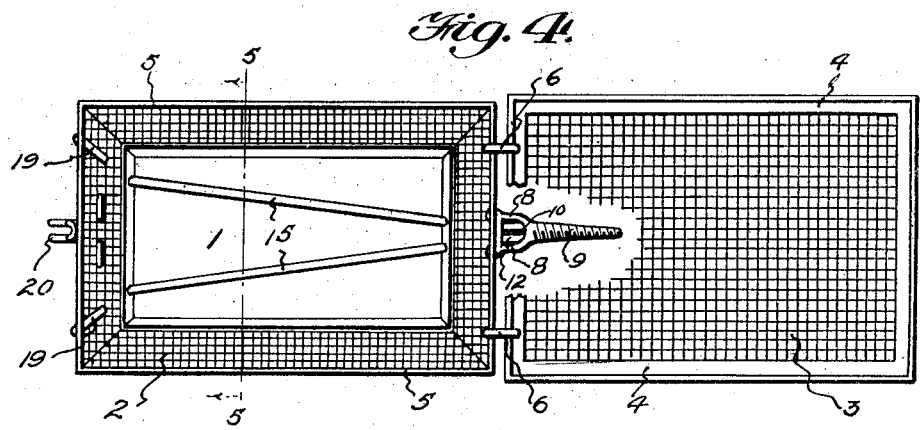
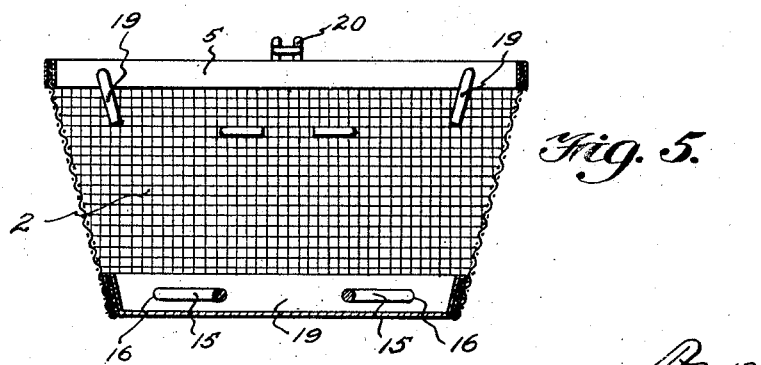
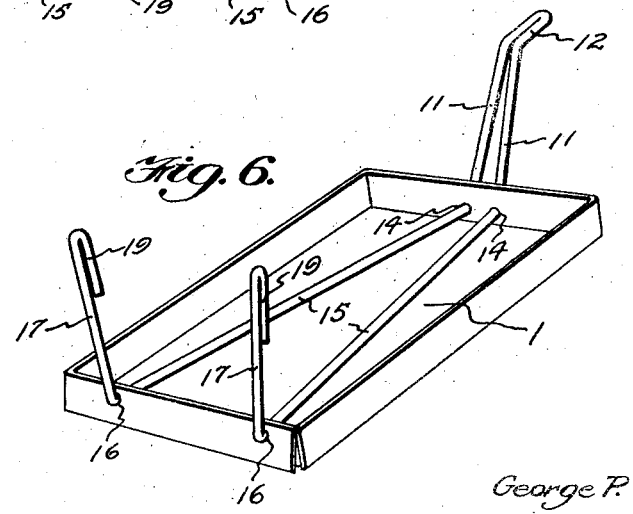
George P. Ames
INVENTOR
BY Victor J. Evans
ATTORNEY
WITNESS:

UNITED STATES PATENT OFFICE.

GEORGE P. AMES, OF DERRY, NEW HAMPSHIRE.

CORN-POPPER.

1,382,592. Specification of Letters Patent. Patented June 21, 1921.

Application filed May 8, 1920. Serial No. 379,838.

*To all whom it may concern:*

Be it known that I, GEORGE P. AMES, a citizen of the United States, residing at Derry, in the county of Rockingham and State of New Hampshire, have invented new and useful Improvements in Corn-Poppers, of which the following is a specification.

The present invention has reference to a corn popper, and has for its object to simplify and improve the existing art by producing a device of this character which may be constructed in a simpler, cheaper and stronger manner than usually.

A further object of the invention is to produce a novel means for connecting the non-reticulated bottom of a corn popper to the reticulated body thereof, and wherein said connecting means provides a reinforcing or bracing device for the body.

Other objects and advantages will present themselves as the nature of the invention is better understood, reference being had to the drawings in which there is illustrated a simple and satisfactory embodiment of the improvement reduced to practice, and in which:—

Fig. 4 is a plan view with the cover open.

Fig. 5 is a sectional view approximately on the line 5—5 of Fig. 4.

Fig. 6 is a perspective view of the pan and the member associated therewith for securing the pan to the body of the device as well as sustaining the lower edge of the body against the pan and for spacing the outer edge of the body from the pan.

Figure 1:
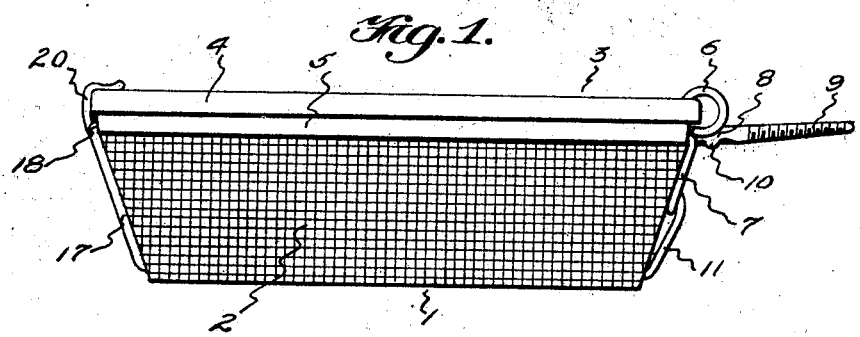
Figure 1 is a general view of a corn popper, constructed in accordance with this invention.
Figure 2:
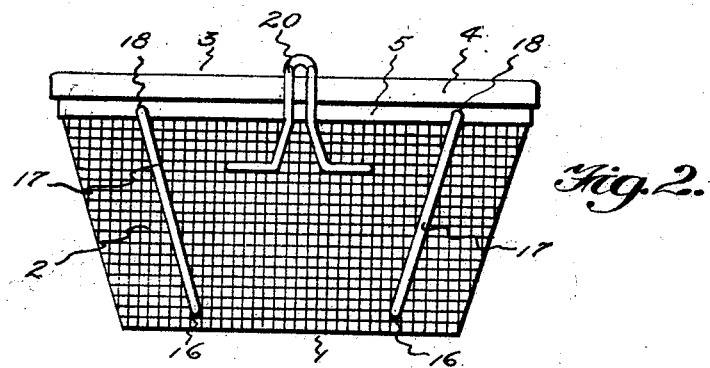
Fig. 2 is a view looking toward the front end thereof.
Figure 3:
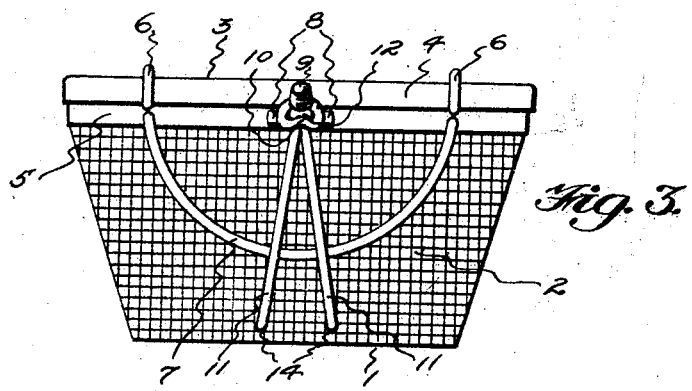
Fig. 3 is a similar view looking toward the rear end thereof.

My improved corn popping device comprises a reticulated body provided with the usual hinged closure, also of reticulated material, and a non-reticulated bottom which is in the nature of a pan. The pan is indicated by the numeral 1, the body by the numeral 2 and the hinged top or closure by the numeral 3.

The top 3 of the closure has its reticulated surface received in a non-reticulated frame 4, while the upper edge of the body 2 is likewise received in a similar frame 5. Between the frames 4 and 5, at one of the ends of the device the looped ends 6 of a bail 7 pass, and these looped ends provide the hinged connection between the top and body. The center of the loop bears against one of the ends of the reticulated body. At the hinged end of the device the frame 5 for the body has secured thereto the bifurcated ends 8 of a screw 9 to which the handle is attached. The ends or arms 8 are connected together by an integral lug 10, which has an opening therethrough.

The sides and ends of the reticulated body are inclined inwardly toward the flanged pan and terminate with the bottom of the pan.

Arranged against the inclined end of the body to which the closure is hinged are the end strands 11 of a wire member. The strands are brought together adjacent to the top of the body and are extended outwardly as at 12, the said portion providing a lip that passes between the arms of the screw and that also passes through the opening in the lug connecting the said arms. The strands of the wire pass through the lower edge of the body at this end of the device and also through spaced openings 14 in one of the end flanges of the pan 1. The wire members are further spread away from each other and continued over the inner face of the pan, as indicated by the numeral 15. These strands 15 pass through openings 16 adjacent to the corners at the opposite end flange of the pan and also through the reticulated end portion of the body 2. The strands are then continued upwardly, as at 17, in a line with the outer wall of the reticulated body and are passed through openings 18 in the outer member of the frame 5, and from thence are bent downwardly as at 19 against the inner face of the outer end of the body. On the said outer end there is a catch 20 that engages with the frame 4 of the body and closure to hold the latter in closed position on the body.

With my improvement it will be noted that the body of the corn popper is secured to the pan at only the ends thereof, that the securing means having their central portions disposed in the pan provide what may be termed ribs that will materially assist in the turning of the corn to be popped in the device. It will be also noted that the angle ends of the securing or connecting means, being disposed at the ends of the body and connected to the end members of the frame at the upper edge of the body reinforce the said ends of the body, and also hold the outer portion of the body properly spaced from the pan. The lip 12 provided by the wire connecting member between the body and pan being arranged in the bifurcated end of the screw 9, to which the handle is attached, and contacting with the lug 10 thereof, reinforces the screw at its connection with the body.

Having thus described the invention, what I claim is:—

A corn popper comprising a reticulated body, a metallic frame for the outer edge thereof, a screw for supporting a handle, said screw being connected to one end of the frame and having its said connecting end provided with spaced arms and a lug connecting the arms, a flanged pan providing a bottom for the body, and a wire member for securing the pan to the body, said wire being centrally bent upon itself to provide contacting portions which are received between the arms and over the lug of the screw, the strands of wire from the said contacting portions being arranged against one of the ends of the body and being gradually spaced away from each other and further bent at a substantially right angle to the last mentioned portion and extended through the end of the body, the end of the pan and over the top of the pan, said last mentioned strands being also gradually spaced away from each other whereby the outer ends thereof pass through the other end of the pan adjacent to the corners thereof, the strands being bent upwardly over the other end of the body and having their ends passed through the other end of the frame and from thence bent inwardly and downwardly against the inner face of the said end of the frame and the inner face of the other end of the body.

In testimony whereof I affix my signature.

GEORGE P. AMES.